(12) United States Patent
Bellamy et al.

(10) Patent No.: US 8,903,691 B2
(45) Date of Patent: *Dec. 2, 2014

(54) LINKING GRAPHICAL USER INTERFACE TESTING TOOLS AND HUMAN PERFORMANCE MODELING TO ENABLE USABILITY ASSESSMENT

(71) Applicants: International Business Machines Corporation, Armonk, NY (US); University of Nebraska, Lincoln, NE (US)

(72) Inventors: Rachel K. E. Bellamy, Bedford, NY (US); Myra B. Cohen, Lincoln, NE (US); Bonnie E. John, New York City, NY (US); Padmanabhan Santhanam, Yorktown Heights, NY (US); Amanda M. Swearngin, Fargo, NE (US)

(73) Assignee: International Business Machines Corporation, Armonk, NY (US)

( * ) Notice: Subject to any disclaimer, the term of this patent is extended or adjusted under 35 U.S.C. 154(b) by 26 days.

This patent is subject to a terminal disclaimer.

(21) Appl. No.: 13/672,237

(22) Filed: Nov. 8, 2012

(65) Prior Publication Data

US 2014/0122043 A1    May 1, 2014

Related U.S. Application Data

(63) Continuation of application No. 13/666,189, filed on Nov. 1, 2012.

(51) Int. Cl.
| | |
|---|---|
| *G06G 7/48* | (2006.01) |
| *G09G 5/00* | (2006.01) |
| *G06F 3/00* | (2006.01) |
| *G06F 11/36* | (2006.01) |
| *G06F 3/048* | (2013.01) |
| *G06F 17/00* | (2006.01) |

(52) U.S. Cl.
CPC ............ *G06F 17/00* (2013.01); *G06F 11/3664* (2013.01); *G06F 3/048* (2013.01)
USPC ............... 703/6; 345/650; 345/661; 345/676; 715/700

(58) Field of Classification Search
None
See application file for complete search history.

(56) References Cited

U.S. PATENT DOCUMENTS

| | | | |
|---|---|---|---|
| 6,961,873 | B2 | 11/2005 | Dubovsky |
| 7,289,964 | B1 | 10/2007 | Bowman-Amuah |

(Continued)

FOREIGN PATENT DOCUMENTS

WO    2005/082072 A2    9/2005

OTHER PUBLICATIONS

"Glean: A Computer-Based Tool for Rapid GOMS Model Usability Evaluation of User Interface Designs", Kieras et al. Nov. 14-17, 1995.*

(Continued)

*Primary Examiner* — Omar Fernandez Rivas
*Assistant Examiner* — Nithya J Moll
(74) *Attorney, Agent, or Firm* — Tutunjian & Bitetto, P.C.; Nidhi Garg

(57) ABSTRACT

Systems and computer program products for providing usability predictions are set forth herein. A system includes a test case collector for obtaining test cases for analyzing usability of a graphical user interface of a given software application, the test case collector having at least a memory storing the test cases. The system further includes a human performance model generator for automatically generating a human performance model based on the test cases. The system also includes a usability predictor for generating the usability predictions based on the human performance model. The test case collector automatically generates at least some of the test cases from an analysis of the given software application.

24 Claims, 10 Drawing Sheets

(56) References Cited

U.S. PATENT DOCUMENTS

| | | | | |
|---|---|---|---|---|
| 2007/0219781 | A1* | 9/2007 | Roche et al. | 704/9 |
| 2010/0095161 | A1 | 4/2010 | Giat | |
| 2010/0235808 | A1* | 9/2010 | Dayan et al. | 717/104 |
| 2010/0305991 | A1* | 12/2010 | Diao et al. | 705/7 |
| 2010/0318970 | A1 | 12/2010 | Grechanik et al. | |

OTHER PUBLICATIONS

"Model-Based Testing in Practice", Dalal et al. ACM 1999.*

Dolecal, "A Study of Fidelity Level and Task/Non-Task Based Testing Scenarios on the Effectiveness of Usability Testing," Thesis (M.S. H.F.S.), Embry-Riddle Aeronautical University 2004. (71 pages).

Hackner et al., "Test Case Generator for GUITAR," Proceeding ICSE Companion '08 Companion of the 30th international conference on Software Engineering, May 2008. (5 pages).

Li et al., "Effective GUI Test Automation: Developing an Automated GUI Testing Tool", John Wiley & Sons, Nov. 2004. pp. 20-35.

Memon, "Automatically Repairing Event Sequence-Based GUI Test Suites for Regression Testing," ACM Transactions on Computational Logic, vol. V, No. N, Sep. 2007, pp. 1-35.

Nguyen et al., "Automated Functionality Testing through GUIs," Proc. 33rd Australasian Computer Science Conference (ACSC 2010), Jan. 2010, pp. 153-162.

Swearngin et al., "Easing the Generation of Predictive Human Performance Models from Legacy Systems," Proceedings of the 2012 ACM annual conference on Human Factors in Computing Systems, May 2012. (10 pages).

* cited by examiner

LINKING GRAPHICAL USER INTERFACE TESTING TOOLS AND HUMAN PERFORMANCE MODELING TO ENABLE USABILITY ASSESSMENT

RELATED APPLICATION INFORMATION

This application is a Continuation application of co-pending U.S. patent application Ser. No. 13/666,189 filed on Nov. 1, 2012, incorporated herein by reference in its entirety.

GOVERNMENT RIGHTS

This invention was made with Government support under the following contracts: Contract No. CCF-0747009 (National Science Foundation (NSF)); Contract No. CNS-0855139 (National Science Foundation (NSF)); and Contract No. FA9550-10-1-0406 (Air Force Office of Scientific Research (AFOSR)). The Government has certain rights in this invention.

BACKGROUND

1. Technical Field

The present principles relate generally to usability assessment and, in particular, to linking graphical user interface testing tools and human perfoimance modeling to enable usability assessment.

2. Description of the Related Art

Regression testing of usability has remained largely untreated in the software engineering (SE) literature. However, regression testing of usability is an important consideration in software development, because as systems grow in functionality, they often also grow in complexity, which can hurt end-user efficiency and discoverability (i.e., the ability for a new user to discover how to accomplish a task through exploring the interface). Usability testing is traditionally empirical, bringing end-users in to a testing facility, asking them to perform tasks on the system (or prototype), and measuring such things as the time taken to perform the task, the percentage of end-users who can complete the task in a fixed amount of time, and the number and type of errors made by the end-users. However, both collecting and analyzing the human data is time consuming and expensive.

SUMMARY

According to an aspect of the present principles, a system for providing usability predictions is set forth. The system includes a test case collector for obtaining test cases for analyzing usability of a graphical user interface of a given software application, the test case collector having at least a memory storing the test cases. The system further includes a human performance model generator for automatically generating a human performance model based on the test cases. The system also includes a usability predictor for generating the usability predictions based on the human performance model. The test case collector automatically generates at least some of the test cases from an analysis of the given software application.

According to another aspect of the present principles, a system for providing usability predictions is set forth. The system includes a test case generator for obtaining test cases for analyzing usability of a graphical user interface of a given software application, and a semantic evaluator for semantically evaluating the test cases to generate test case semantic data. The system further includes a test case pruner for pruning test cases responsive to one or more predefined criterion relating to the test case semantic data, and a rule generator for generating a set of rules that semantically refines one or more tasks applicable to the graphical user interface responsive to the test case semantic data. The system also includes a test case executor for executing the test cases to generate test case execution data. The system additionally includes a human performance model generator for automatically generating a human performance model based on the test case execution data, and a usability predictor for generating the usability predictions based on the human performance mode.

According to yet another aspect of the present principles, a computer program product for providing usability predictions is set forth. The computer program product includes a computer readable storage medium having program code embodied therewith. The program code executable by a computer to perform a method. The method includes obtaining test cases for analyzing usability of a graphical user interface of a given software application. The method also includes executing the test cases to generate test case execution data. The method additionally includes automatically generating a human performance model based on the test case execution data, and generating the usability predictions based on the human performance model. At least some of the test cases are generated automatically from an analysis of the given software application.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

The present principles are directed to linking graphical user interface testing tools and human performance modeling to enable usability assessment. In an embodiment, the present principles integrate human performance modeling tools with graphical user interface (GUI) testing tools to produce a novel system for usability testing. Initially, test cases are defined for a particular software. The system runs the test cases on the software to generate a human performance model and a task model for each test case. The system runs the human performance model to produce a usability prediction for each task.

The present principles make it easier for usability analyses to be done as part of the software life-cycle. In particular, the present principles facilitate usability analyses of legacy systems. The present principles accomplish this by integrating human performance modeling tools that use a model of a user to predict usability of an application, with GUI testing tools that allow testers to define test cases. Hence, the present principles advantageously integrate/link functional GUI testing tools with usability testing tools.

Thus, the present principles advantageously provide a system that generates human performance models from test cases. As used herein, a "task" is some goal that will be achieved on the interface such as creating a table, or inserting the date and time. "Methods" are the concrete steps in the user interface (UI) that accomplish the task.

It is to be appreciated that one or more of the steps described herein can be performed by a human. However, it is to be further appreciated that the methodology of the present principles described herein can be fully or partially performed automatically by a machine such as a computer or other processing device that, at the least, includes a processor and memory. Given the teachings of the present principles provided herein, one of ordinary skill in the art will contemplate these and other variations of the present principles while maintaining the spirit of the present principles.

Figure 1:
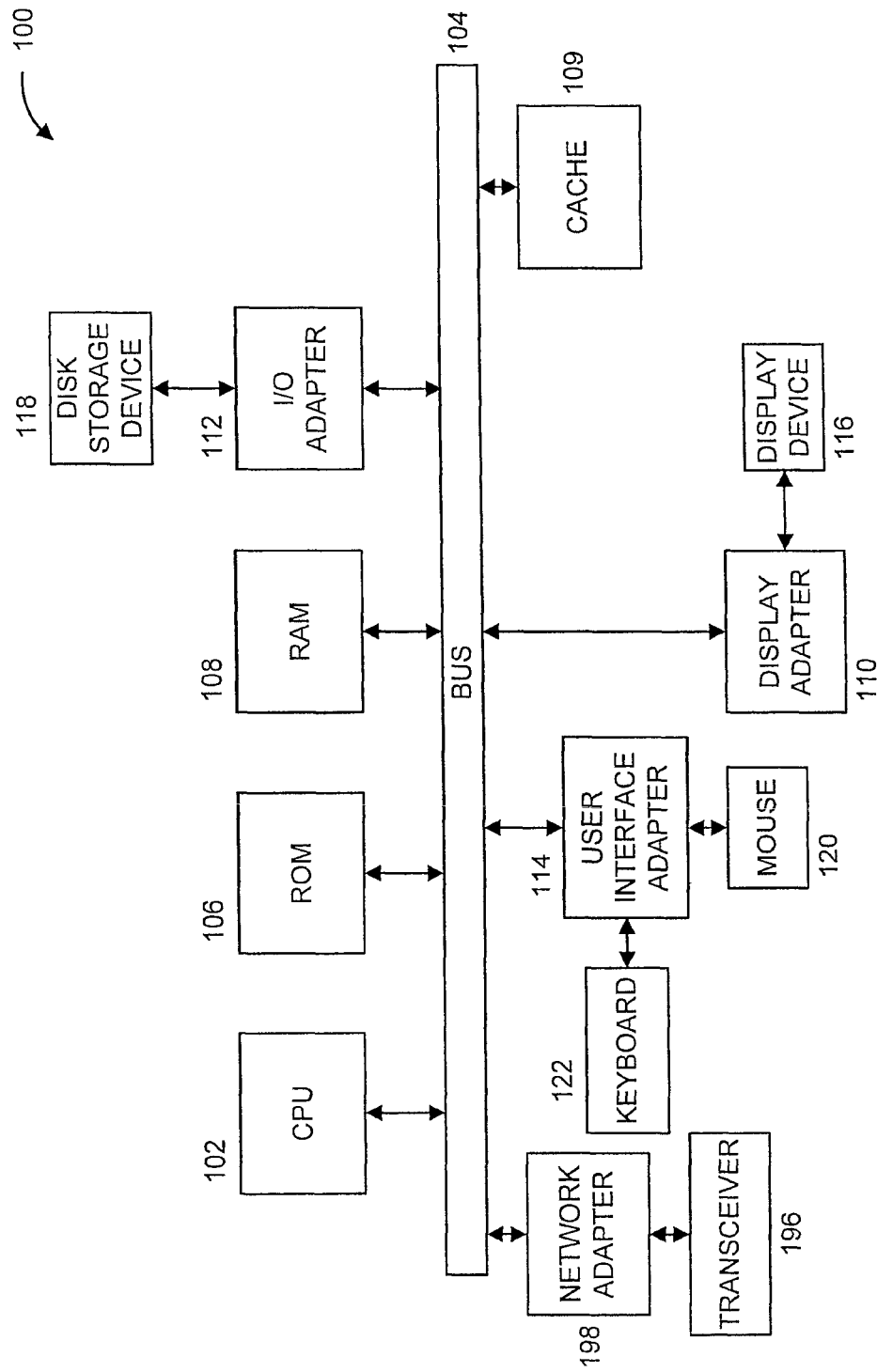
FIG. 1 shows an exemplary processing system 100 to which the present principles may be applied, in accordance with an embodiment of the present principles.

FIG. 1 shows an exemplary processing system 100 to which the present principles may be applied, in accordance with an embodiment of the present principles. The processing system 100 includes at least one processor (CPU) 102 operatively coupled to other components via a system bus 104. A read only memory (ROM) 106, a random access memory (RAM) 108, a display adapter 110, an I/O adapter 112, a user interface adapter 114, and a network adapter 198, are operatively coupled to the system bus 104.

A display device 116 is operatively coupled to system bus 104 by display adapter 110. A disk storage device (e.g., a magnetic or optical disk storage device) 118 is operatively coupled to system bus 104 by I/O adapter 112. A mouse 120 and keyboard 122 are operatively coupled to system bus 104 by user interface adapter 114. The mouse 120 and keyboard 122 are used to input and output information to and from system 100. A transceiver 196 is operatively coupled to system bus 104 by network adapter 198.

Of course, the processing system 100 may also include other elements (not shown), as readily contemplated by one of skill in the art, as well as omit certain elements. For example, processing system 100 can include any input device, output device and/or other type of device capable of interfacing with the processing system 100 and/or a graphical user interface implemented using the processing system 100. Moreover, it is to be appreciated that one or more elements of processing system 100 can be included in one or more elements of the systems and devices described herein including, for example, one or more elements of system 200 of FIG. 2.

Figure 3:
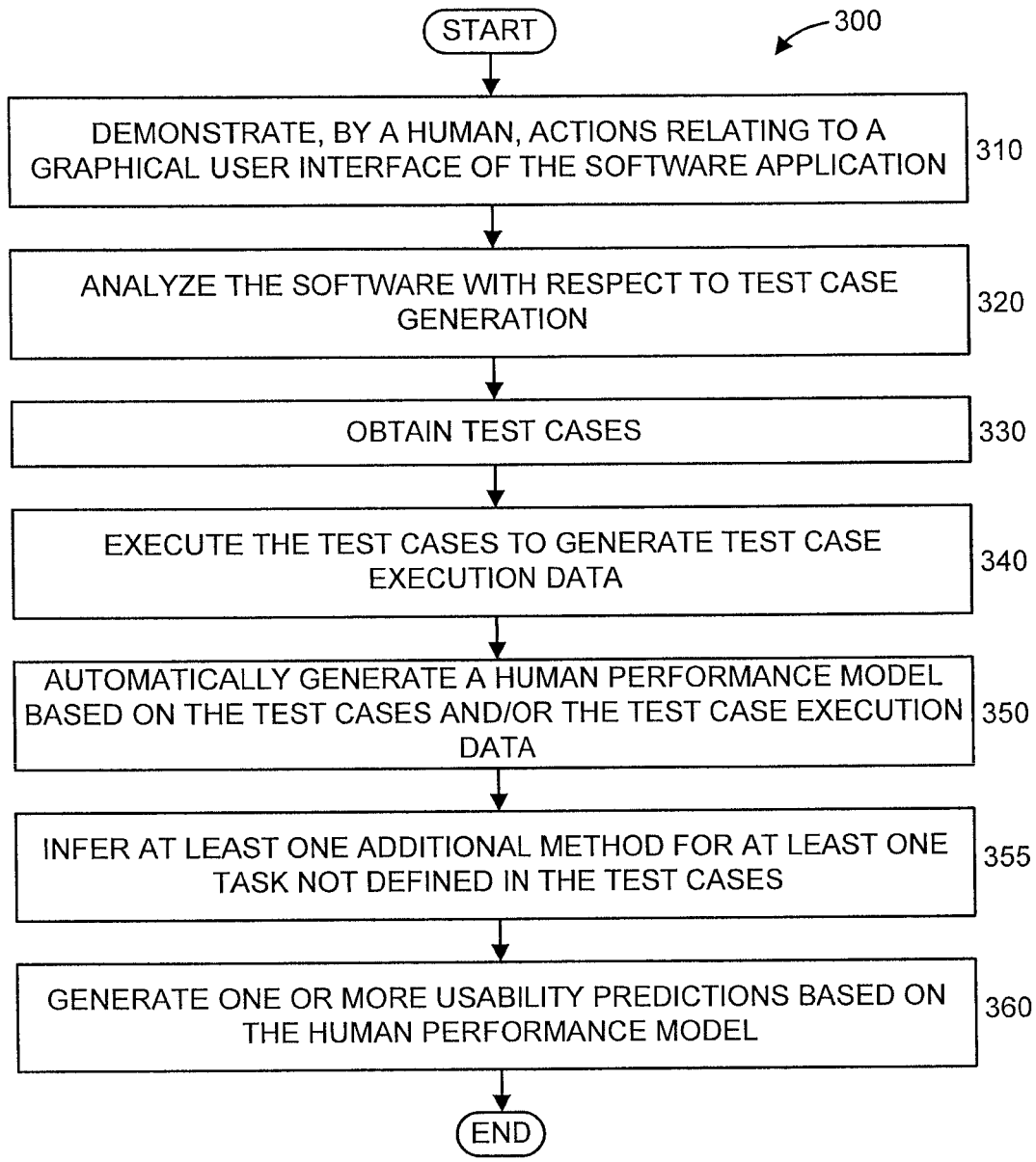
FIG. 3 shows an exemplary method 300 for usability assessment based on linking graphical user interface testing tools and human performance modeling, in accordance with an embodiment of the present principles.

Further, it is to be appreciated that processing system 100 may perform at least part of the methods described herein including, for example, parts of method 300 of FIG. 3.

Figure 2:
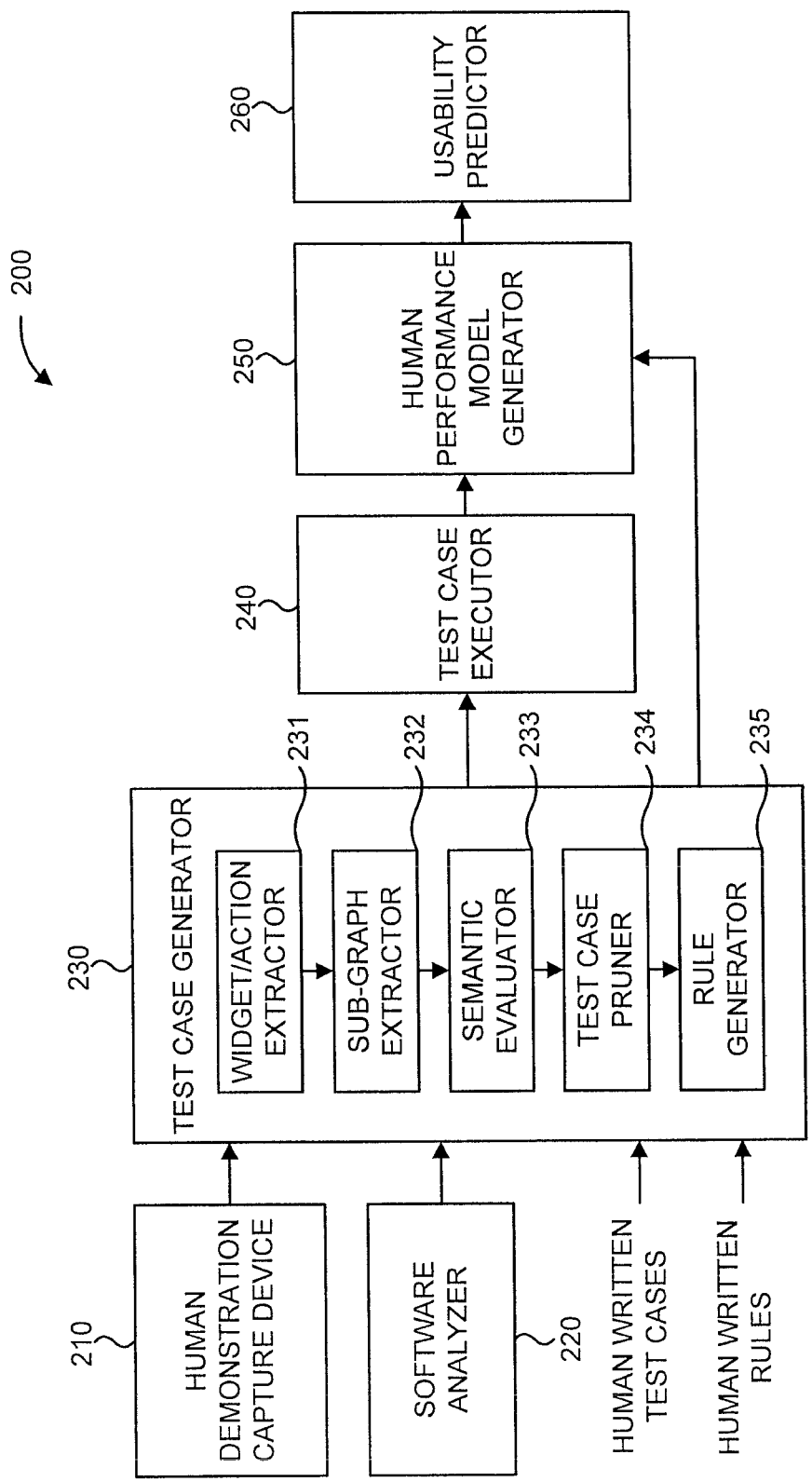
FIG. 2 shows an exemplary system 200 for usability assessment based on linking graphical user interface testing tools and human performance modeling, in accordance with an embodiment of the present principles.

FIG. 2 shows an exemplary system 200 for usability assessment based on linking graphical user interface testing tools and human performance modeling, in accordance with an embodiment of the present principles. The system 200 includes a human demonstration capture device 210, a software analyzer 220, a test case collector 230, a test case executor 240, a human performance model generator 250, and a usability predictor 260.

The human demonstration capture device 210 captures a demonstration by a user. In an embodiment, the demonstration is of a human using a graphical user interface of a particular software application. In an embodiment, the human demonstration capture device 210 can be and/or otherwise include a keystroke logger.

The software analyzer 220 analyzes the software application with respect to test case generation. That is, the software application is analyzed to generate test case generation data therefrom that can be subsequently used to generate one or more test cases relating to the software application. In an embodiment, the analysis is particularly focused on the graphical user interface of the software application.

The test case collector 230 collects test cases and/or test case data. In some embodiments, the test case collector further serves to generate test cases on its own from collected test case data and even from other test cases. As such, the test case collector 230 is also interchangeably referred to herein as "test case generator". Thus, the test cases and/or test case data can be based on one or more test cases or test case data input by a human, data obtained from the human demonstration capture, and/or the test case generation data obtained from the software analyzer 220. Thus, test cases and/or test case data can be generated by the test case collector 230 and/or pre-generated and inputted to the test case collector 230, which can then perform further processing such as semantic evaluation, pruning, and so forth, in order to provide the actual test cases and/or test case data that is used by the human performance model generator 250 to generate a human performance model. Moreover, in an embodiment, the test case collector 230 may also infer additional possible methods for tasks not defined in the test cases.

In an embodiment, the test case collector 230 includes a widget and action extractor 231, a sub-graph extractor 232, a semantic evaluator 233, a test case pruner 234, and a rule generator 235. The widget and action extractor 231 extracts widgets and actions that form the full set of events that can be used to achieve a given task. The sub-graph extractor 232 receives the set of events and generates an EFG(s) responsive thereto. The semantic evaluator 231 evaluates the test cases to identify cases that are semantically meaningful and test cases that are not semantically meaningful from an end-user's point of view. Thus, the semantic evaluator 231 can receive all of the test cases, evaluate the test cases, and then output the test cases along with semantic data. The test case pruner 234 prunes from further consideration the test cases that have been determined to not be semantically meaningful. Thus, the test case pruner 234 will not pass along the pruned test cases to the next element, namely the rule generator 235. The rule generator 235 generates rules that semantically refine one or more tasks for the test cases that have been determined to be semantically meaningful.

The test case executor 240 executes the test cases to generate test case execution data. In an embodiment, the test case executor 240 includes at least a processor. In some embodiments, one or more test cases can bypass execution and simply be used in unexecuted or other (in the case of non-executable data) form by the human performance model generator 250.

The human performance model generator 250 generates a human performance model based on the test cases and/or test case execution data obtained from executing the test cases. In an embodiment, the human performance model includes a user interface model and task models.

The usability predictor 260 generates usability predictions based on the human performance model. The usability predictions include, but are not limited to, a skilled execution time, a navigation path for a given task, an alternate navigation path for the given task, and so forth.

It is to be appreciated that system 200 may perform at least part of the methods described herein including, for example, parts of method 300 of FIG. 3.

FIG. 3 shows an exemplary method 300 for usability assessment based on linking graphical user interface testing tools and human performance modeling, in accordance with an embodiment of the present principles. In the example of method 300, the usability assessment pertains to a software application.

At step 310, a human demonstrates actions relating to a graphical user interface of the software application.

At step 320, the software application is analyzed with respect to test case generation.

At step 330, test cases are obtained. Step 330 can involve, for example, some of the test cases being written by a human and some of the test cases being automatically generated from the demonstration performed at step 310 or from the analysis performed at step 320. The test cases can include and/or otherwise involve, but is not limited to: a sequence of parameterized inputs; a sequence of user interface states; and/or so forth. The sequence of parameterized inputs can include, but are not limited to, one or more of the following: widgets to be selected; text to be entered; and so forth At step 340, one or more of the test cases are executed to generate test case execution data. It is to be appreciated that test cases do not require execution in order to provide data for use by step 350 (i.e., automatic generation of human performance models). However, execution of one or more test cases provides additional data for use by step 350.

At step 350, a human performance model(s) is automatically generated based on the test cases and/or the test case execution data. In an embodiment, a respective human performance model can be automatically generated for each test case. In such an embodiment, each respective human performance model can be automatically generated based on the test case execution data for a respective test case from among a set of many test cases and/or the respective test cases itself without execution.

At step 355, at least one additional method is inferred for at least one task not defined in the test cases.

At step 360, one or more usability predictions are generated based on the human performance model(s). Such usability predictions can include, for example, but are not limited to: a skilled execution time for one or more tasks; a navigation path for one or more tasks; an alternate navigation path for one or more tasks; a user error; and so forth. As used herein, "navigation path" and "alternate navigation path" refer to the series of steps, i.e., the methods that are performed for a given task. As is evident, a given task can have more than one navigation path.

A description will now be given of various tools to which the present principles can be applied, in accordance with an embodiment of the present principles. Of course, the present principles are not limited solely to the following described tools and can be used with other tools or functionality, while maintaining the spirit of the present principles.

Research in the field of human-computer interaction (HCI) has produced methods and tools for predictive human performance modeling, i.e., "simulated end-users". For example, in one particular tool, CogTool, the designer can create a storyboard of an inter-face and demonstrate methods for accomplishing tasks on that storyboard. CogTool captures each demonstration and creates a computational cognitive model of a skilled user based on the Keystroke-Level Model (KLM). This model is run in the Adaptive Control of Thought-Rational (ACT-R) cognitive architecture producing a quantitative prediction of mean execution time by a skilled user. User interface (UI) designers use these predictions to evaluate proposed designs prior to implementation, before skilled users exist. Although CogTool is an order of magnitude faster than doing KLMs by hand, it is still time-intensive, since the designer must construct the storyboard (i.e., draw out all the screens, widgets, and actions the user would need to accomplish tasks) and demonstrate all the methods for accomplishing tasks.

A tool CogTool-Helper eliminates much of this manually intensive process. CogTool-Helper merges the tools and techniques from the HCI cognitive modeling community with those of the software testing community. In CogTool-Helper, we use graphical user interface (GUI) test replay tools which mimic a user by repeating each step of a test case on the interface automatically. While the replayer is running, we capture the various steps of the test case and translate this to a CogTool model. The model might be any, or a combination of: a CogTool method, a UI storyboard and a task description.

GUI interfaces have been represented as graphs allowing greater scalability than finite state machines. An event is the result of an event-handler in the application responding when a user (or program) interacts with the interface by clicking a button, touching a screen widget or typing a keyboard shortcut. These directed graphs describe the relationships between events (e.g., which events can follow others) and their properties (e.g., structural or system interaction). An event flow graph (EFG) can be automatically extracted from a GUI using a tool called a ripper. The ripper performs a single execution of the program, using a depth first traversal of the interface, opening all menus, windows and reachable widgets and buttons. As it performs these events, it extracts the state of the interface (each of the widgets, buttons, etc. and their properties and relationships to each other).

The EFG for an application can then be traversed to generate test cases of a specified length and that satisfy specific event coverage criteria. Test cases are stored and can then be automatically replayed on the GUI. The GUI Testing Framework, GUITAR, is a set of open source tools, available for a variety of user interface platforms. GUITAR includes a ripper, a replayer and test case generator.

These test cases and tools can provide feedback on the functional correctness and completeness of GUIs and, since they are automatic, they provide a tractable approach for use in regression testing. However, such tests give no insight into the quality of the GUI, that is, whether the GUI will be useable (e.g., efficient or discoverable for end users).

Figure 4:
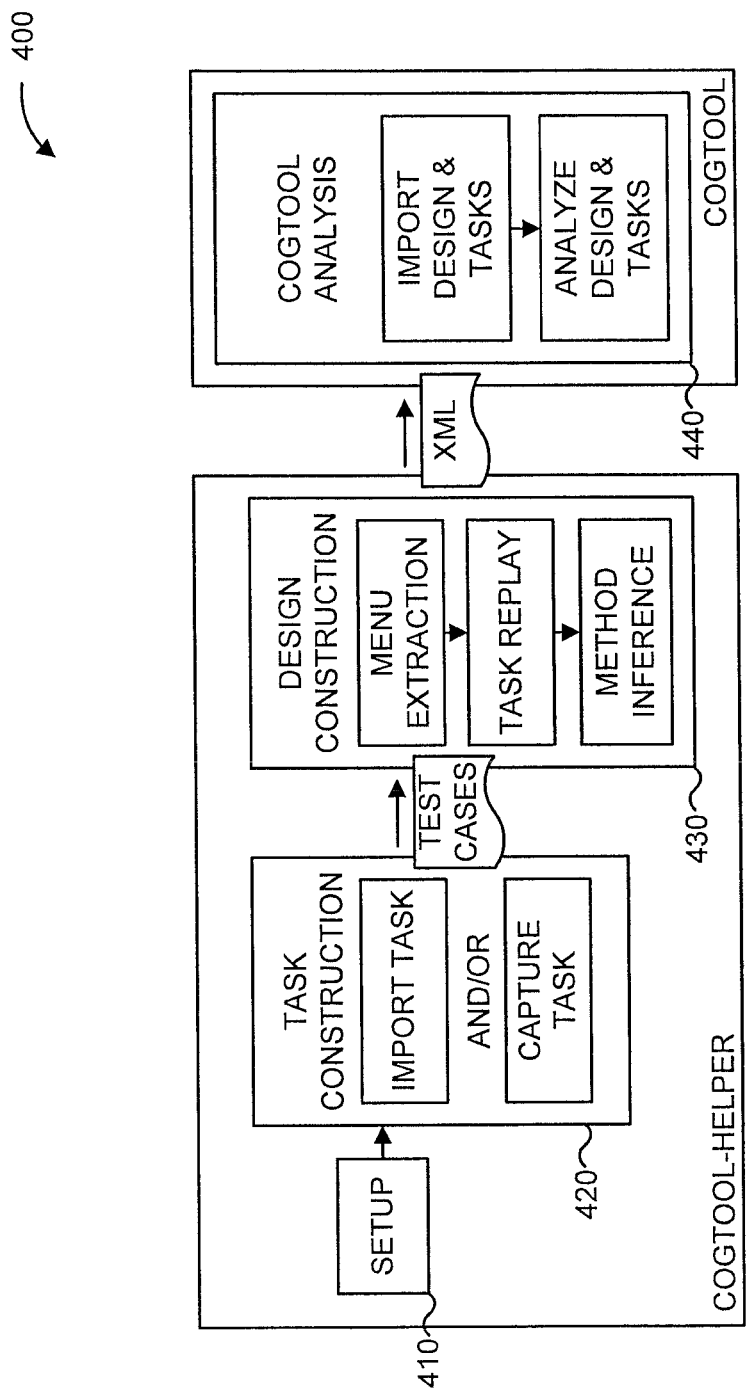
FIG. 4 shows a process 400 performed by CogTool-Helper to which the present principles can be applied, in accordance with an embodiment of the present principles;\

CogTool-Helper links CogTool and GUITAR to generate designs and task methods in a semi-automated fashion and analyzes them for skilled user efficiency. FIG. 4 shows a process 400, performed by CogTool-Helper, to which the present principles can be applied, in accordance with an embodiment of the present principles. After an initial setup (step 410) in which the UI designer selects the application that he/she will evaluate, the main part of CogTool-Helper begins.

In step 420, the UI designer will create one or more tasks. Within CogTool-Helper this can be done with capture (by demonstrating one or more methods for a task(s) on the application), or by encoding test cases in an XML format. In step 430, CogTool-Helper will then open the application, extract some needed information from the menus (which is analogous to a partial ripping of the interface), replay the test cases and in the process take screen-shots, and encode UI widgets as CogTool widgets. The result is a translation into a CogTool project that includes a design, one or more tasks, and one method for each test case. The last part of this phase is to obtain inferred methods (methods which are not defined as input through a test case). Through a graph traversal of the frames of the design, alternative paths to perform the same task are identified and methods are generated for these paths. The output of step 430 is an XML project (or a project in some other form or representation, as readily contemplated by one of ordinary skill in the art) that can be imported into and analyzed in CogTool (step 440). Once imported, CogTool will calculate the KLM predictions for each method within each task. The UI designer can explore and/or modify the designs and tasks as they can with any other CogTool project.

A general overview of the present principles will now be provided, in accordance with an embodiment of the present principles.

Automated regression testing in GUIs typically requires: (1) a model of the interface; (2) a technique to generate test cases; and (3) a method for replaying the test cases on the interface.

In functional GUI testing, test cases are selected or generated with respect to their functional capability, but in human performance evaluation test cases must be semantically meaningful from an end-user's point of view. For example, it makes sense in functional GUI testing to use test cases that include clicking on the same button twice because hidden problems such as incorrect initialization, undetected on the first click, would be revealed through such a test case. However, evaluating such test cases for efficiency of task execution by skilled users would not be worthwhile since accomplishing a real-world task would not include superfluous repeat button presses. Thus, we will use functional test case generation techniques and tools, but constrain them to produce only test cases meaningful to the end-user.

Since users can often accomplish tasks in many different ways, we want to specify the task with as few orderings as possible, moving away from the strictly procedural view of a task. Moreover, we want the UI designer to be able to explore differences in user behavior caused by differences in structural events. For instance, if a user utilizes the toolbar to make text bold, this presents different human performance results than making text bold by opening the Format menu.

In an embodiment, we therefore utilize the class of GUI test generation tools which represent the GUI as a graph, such as an EFG. We use the GUITAR testing framework as our exemplar for this process, because we already use its replay mechanism as the technical implementation for CogTool-Helper. We present details of its implementation when describing our process, but point out that we believe the process is general and could be developed using other tools as well. That is, while the present principles are described herein with respect to certain tools such as CogTool, CogTool-Helper, GUITAR, and so forth, it is to be appreciated that the present principles are not limited to the preceding tools and, thus, other tools and related functionality can also be used in accordance with the teachings of the present principles, while maintaining the spirit of the present principles.

Figure 5:
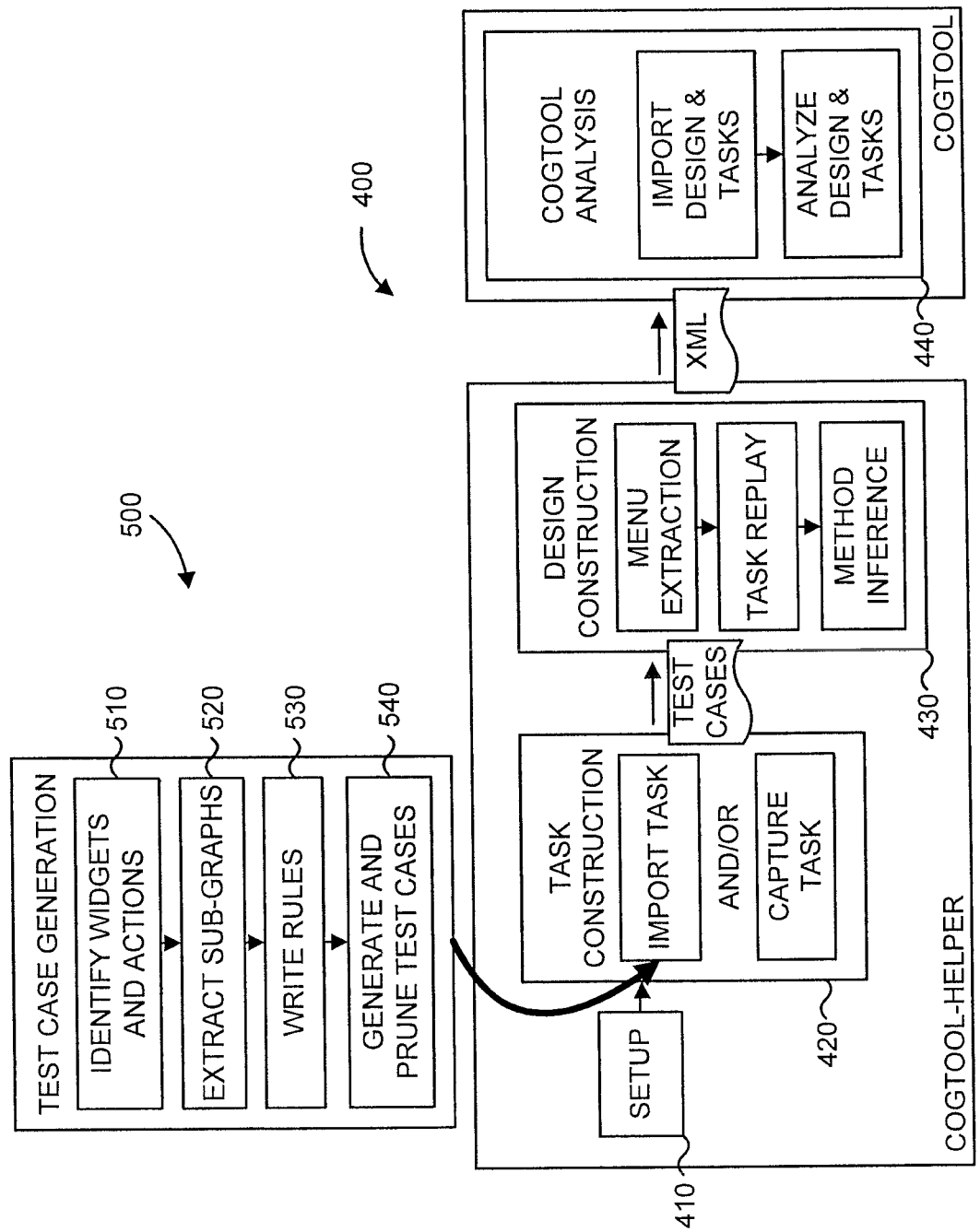
FIG. 5 shows an extension 500 to the process 100 performed by CogTool-Helper, in accordance with an embodiment of the present principles.

FIG. 5 shows an extension 500 to the process 100 performed by CogTool-Helper, in accordance with an embodiment of the present principles. The bottom portion of FIG. 5 is our existing process for CogTool-Helper (FIG. 1). Since CogTool-Helper includes an import feature (step 520) we can pass generated test cases from our new process into this phase.

As in any regression testing, the process in FIG. 5 is performed on each successive version of the system that includes an interface modification. The first step in generation (step 510, top of FIG. 5), identifies widgets and their actions that form the full set of events that may be used to achieve our task. For instance, we may include both menu items and keyboard shortcuts; alternatives to achieve the same part of a task. Step 520 creates an EFG that includes only those events and their relationships identified in the step 510. Step 530 defines a set of rules that refine the task to make sense semantically. Step 540 uses the EFG combined with the rules to generate all possible test cases that perform this task.

A description will now be given regarding the identification of widgets and their actions, in accordance with an embodiment of the present principles. Such identification can be performed, for example, by the widget and action extractor 331 of system 300 of FIG. 3.

We present a small task in a word processor to explain our generation process. The task is to type in the text "Chapter One", select the text, and make it bold. The task is executed in LibreOffice, an open source office application. In general, the UI designer will evaluate many tasks on an interface based on their knowledge of their user-base, including tasks far more complex than this one. We have limited this task for illustration purposes, restricting our analysis so that the user types in the text first rather than starting the task by setting the font to bold, but most tasks will not be as restrictive. For this example, we assume a version of the software that has menus, certain keyboard shortcuts and toolbars, any of which, in different combinations, can be used to perform this task.

We use an event-tuple to represent the information required for test case generation, with properties that GUITAR uses to identify and perform actions on the interface: <Title (T), Class (C), Window (W), Action (A), Parent (P), Parameter (R)>.

Title matches the textual label of the widget. When the widget does not have a textual label, such as a button that only displays an icon, but it has a tooltip, then the tooltip text is used. Class describes the type of widget, such as a PUSH-BUTTON, TOGGLEBUTTON, and so forth. Window is the textual label of the window including this event-tuple. Action defines which GUITAR event handler will be used for this event. Its values include "Click" (currently we only support left click), "Typing" (to represent typing with the keyboard), "Set" "Value", "Select from List", "Keyboard Short-cut" and "Keyboard Access". Keyboard Access is used when the keystrokes walk through a hierarchical menu instead of directly accessing a command (e.g., Alt-oh opens the Format menu and selects the Character item). The implementation of GUITAR available to us did not provide keyboard shortcuts, so we have added these to our version.

Parent is optional. Parent is the title of the container for this event-tuple, which provides a way of disambiguating information when more than one widget in a window matches the same Title text, or when a widget does not have any Title text. Parameter, also optional, is only used for widgets with the action Typing. CogTool-Helper supports several actions when typing text, insert, replace, select, unselect and cursor, some of which have additional parameters beyond these six, such as the text to insert or replace.

We expect that a user experience professional would describe the task, but that the regression tester who is more familiar with the structure of the interface would identify these tuples for each event. TABLE 1 shows the event-tuples for our example task, in accordance with an embodiment of the present principles.

TABLE 1

| Sub-Goal | Approach | Partial Event Tuple: <Name, Type, Action> |
|---|---|---|
| Type Text: Chapter One | | 1. <..., PARAGRAPH, Typing> |
| Select All of the Text | A. Toolbar B. Menu C. Keyboard | 2. <Select ALL, PUSH_BUTTON, Click> 3. <Edit, MENU, Click>, 4. <Select All, MENU_ITEM, Click> 5. <Select All, MENU_ITEM, Keyboard Shortcut> |
| Make Text Bold | A. Toolbar B. Menu | 6. <Bold, TOGGLE_BUTTON, Click> 7. <Format, MENU, Click> 8. <Character..., MENU_ITEM, Click> 9. <Bold, LIST_ITEM Select_From_List>, 10. <Okay, PUSH_BUTTON, Click> |

We have reduced the event-tuple to show only <T, C, A>, since they are enough to make each event unique in our example. The first column in TABLE 1 lists the sub-goals of certain tasks. The second column in TABLE 1 lists the approaches that would lead to the events (e.g., using the menu or keyboard). The third column in TABLE 1 shows the event-tuples associated with each approach. In our example, the main paragraph widget for the document has no name (Event Tuple 1). This is a situation where we would use the optional Parent parameter, which would be, in this case, the text for the main document window, "Untitled 1—LibreOffice Writer".

Figure 6:
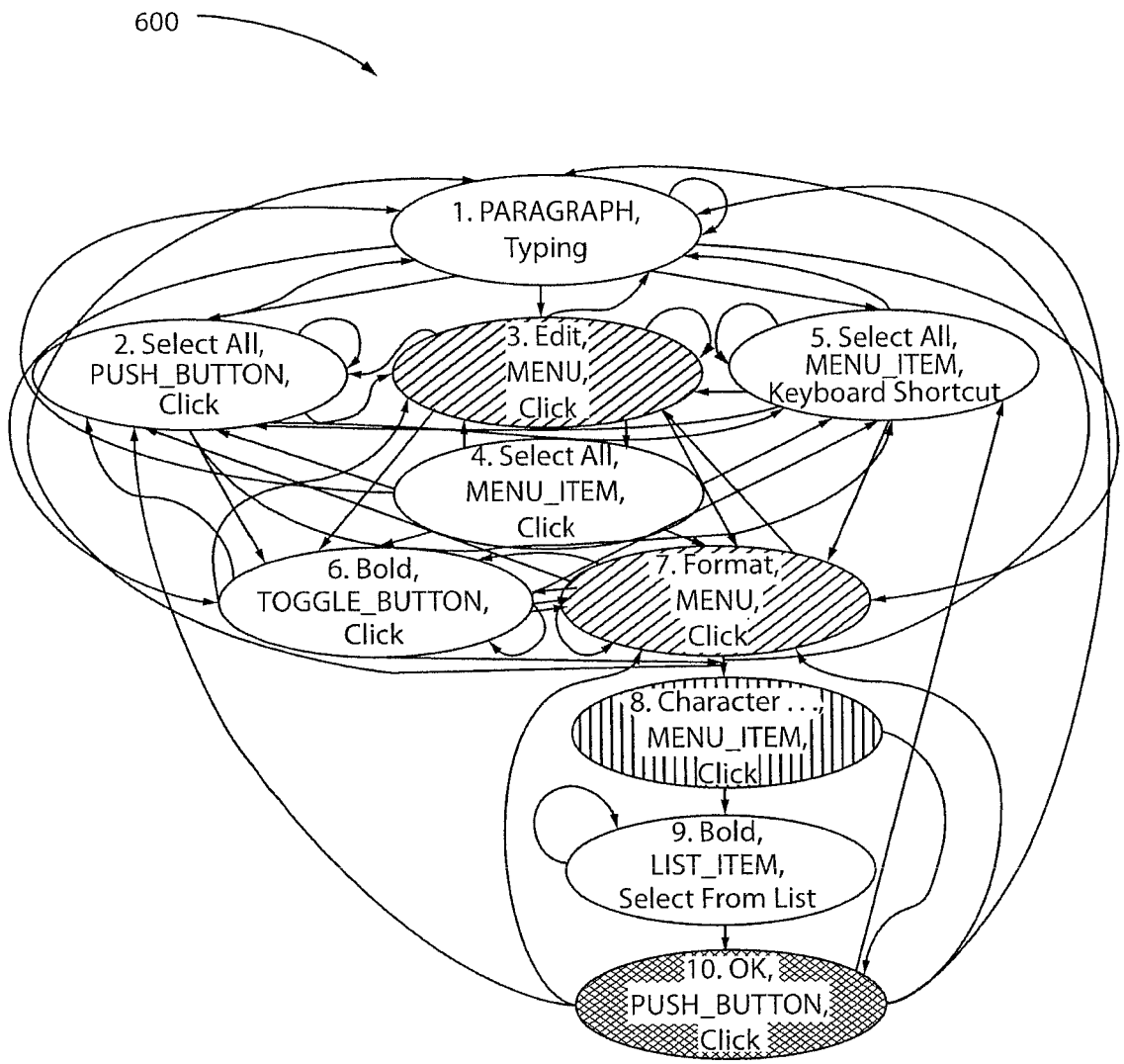
FIG. 6 shows an event flow graph (EFG) 600 representing our example task, in accordance with an embodiment of the present principles.

A description will now be given regarding extracting sub-graphs, in accordance with an embodiment of the present principles. Such extraction can be performed, for example, by the sub-graph extractor 332 of system 300 of FIG. 3. The list of tuples is then passed to a filter, also referred to herein as a "test case pruner". The filter plugs into the GUITAR ripper. The input to the filter is the set of events defined in the previous step. The result is an EFG including only those events included in the input set. Since most EFGs for real applications are very large, The OpenOffice Writer 3.3.0 interface has 605 nodes and 79,107 edges, this filter substantially reduces the number of events and provides a tractable space within which to work. FIG. 6 shows an event flow graph (EFG) 600 representing our example task, in accordance with an embodiment of the present principles. In this EFG 600, we see the 10 events (nodes) corresponding to TABLE 1, and 52 node relationships (edges). FIG. 6 also shows the type of event for each node, encoded by GUITAR as a property of the node. A "System Interaction" event 610 causes a functional change to the system (e.g., selecting all the text). The rest of the events cause structural changes. An "Expand" event 620 opens a menu or a list to allow the user to select from a set of actions. A "Restricted Focus" event 630 opens a modal window; the user must interact with that window until it is closed. An "Unrestricted Focus" (not shown) event opens a non-modal window. We do not have any unrestricted focus events in our example task. Finally, a "Terminal" event 640 closes a window.

A description will now be given regarding defining rules, in accordance with an embodiment of the present principles. Such defining of rules can be performed, for example, by the rule generator 335 of system 300 of FIG. 3A test case is defined as a path through an EFG, often restricted to a specific length. However, even with the EFG reduced to nodes relevant to a particular task, not every path makes sense for human performance regression testing. For example, referring to paths of length 3 possible in FIG. 6, the path with events [#1-#5-#6] (selecting text and making it bold using the toolbar buttons) is semantically meaningful as a representation of a skilled user's behavior when making the text bold. However, [#3-#3-#3] (three clicks on the Edit Menu) is valid for functional testing, but does make the text bold.

To restrict the test cases to those that perform the required task we constrain the same with two kinds of rules. The first is a global rule, enforced for all tasks. Global rules stem from typical skilled user behavior, apply to most tasks, can be written in advance of any particular project or task, and can be reused. The second kind of rule is a task specific rule. These arise from the logic of the specific task and interface and therefore need to be written anew for each task and/or interface to be analyzed. Task specific rules can override global rules if the task and UI so require.

A description will now be given of global rules, in accordance with an embodiment of the present principles. We have defined four global rules used in all tasks in the feasibility study.

1. End in Main Window. The test case should end with a system interaction event in the main window, or with a terminal event resulting in only the main window being opened. This prevents a test case ending in a dialog box with changes that have not been applied, with an open menu, and so forth. Therefore, no expand event, restricted focus event, or an event between a restricted focus event and a terminal event can be the last event in a test case, eliminating events #3, #7, #8, and #9 as potential last events in a test case.

2. Expand Followed by Child Event. An event that expands a menu or list must be immediately followed by an event that is executed on a child of that menu or list. It prevents the test case from expanding a menu or list and then performing no actions on it. For example, after event #3 (Edit, MENU, Click) is performed, the only valid event that can follow in this graph would be #4 (Select All, MENU_ITEM, Click). There is an edge on this graph leading from #3 to #7, but this edge cannot appear in any test case.

3. Window Open and Close Cannot Happen. A window cannot be opened and immediately closed without some other event happening in between. In our EFG, we cannot have event #8 immediately followed by #10, despite an existing edge, because it would result in a meaningless user action. This rule will force the test case generator to take the path from event #8 to #9.

4. No Repeat Events. The last rule is used in combination with a task specific rule. It states that no event can appear more than once in a test case unless it appears in a local rule that overrides it. The user cannot click event #6 (make the text bold) two times in the same test case. We will explain why this rule may be overridden shortly.

A description will now be given regarding task specific rules, in accordance with an embodiment of the present principles. The global rules are primarily structural, enforcing constraints that are necessary for all tasks. However, individual tasks and UIs also have constraints that restrict them based on their functional properties. We have identified four types of constraints and created rules for each.

1. Exclusion. This is a mutual exclusion rule. It says that exactly one of the events included in an exclusion set must be included in each test case. Examples of events that would be in an exclusion set for our example task are #2, #4, and #5. They all achieve the same goal, namely selecting the text.

2. Order. This rule specifies a partial order on events. We group events into Order Groups, i.e., sets of events that are in the same ordering equivalence class, and then place the groups in the required order. Only system interaction events need to appear in order sets, since the other types of events only cause structural changes. In our task, since we required typing the text to happen before all other events to make this example simple enough to explain, we would place #1 (PARAGRAPH, Typing) alone in the first order group. Since, selecting the text must happen in this UI before it can be made bold, we place events #2, #4 and #5 in the second order group. Finally, making the text bold, events #6, and #9 are in the last order group.

3. Required. Events in the required list must appear in all test cases. In our example, the only event that is required is event #1 (PARAGRAPH, Typing).

4. Repeat. Events in the repeat list allow us to include specific events in a test case more than once, overriding the global rule. We do not have any repeat rules in our example task. However, if our task also italicized the text, then we would need to allow #7 (Format MENU, click) to appear more than once since a task that performs both bold and italic using only menus may need to expand the same menu more than once.

A description will now be given regarding generating test cases, in accordance with an embodiment of the present principles. Once we have the EFG and the set of rules, we supply these as input to an existing test case generator and generate all possible tests for this EFG that are valid with respect to the rules. As the generator creates tests, the generator checks each one against the rules and prunes out those that do not pass. We currently use the existing GUITAR test case generator that accepts an EFG and test case length as a starting point. We have added additional functions to check the rules. The generated test cases are then fed into CogTool-Helper, which turns each test case into a CogTool method of how a skilled user might perform this task. In the first part of our feasibility study, we generate all possible test cases so the number of test cases and CogTool methods are equal. In the second part of the study, we evaluate our ability to optimize and only generate a sample of the test cases, using CogTool-Helper's inference process to enhance the set of methods for which CogTool predicts performance time.

A description will now be given of a feasibility study, in accordance with an embodiment of the present principles.

We conducted a preliminary study to determine the feasibility of our approach. We answer the following two research questions. RQ1: Can automated user model creation using CogTool-Helper provide useful information for human performance regression testing? RQ2: What is the impact on cost and effectiveness of sampling test cases?

Consider the situation of an organization that produces office productivity products, like word processing, presentation and spreadsheet software. Products will often go through several versions, often with changes to the UI as well as functionality. The product teams will want to know if the changes are making their users more productive or not, information they can also use in their marketing and sales materials. This feasibility study tests whether automatic generation of test cases for the purpose of usability evaluation (i.e., efficiency) can provide that information.

TABLE 2 shows tasks used in the feasibility study, in accordance with an embodiment of the present principles.

TABLE 2

| LibreOffice Module | Task Name | Task Description | Version | No. Events | No. Rules |
|---|---|---|---|---|---|
| Writer | Format Text | Text Google typed in, selected and made bold and centered | M<br>MK<br>MKT | 9<br>12<br>13 | 4<br>5<br>7 |
| Writer | Insert Hyperlink | Insert Hyperlink to Amazon and make text uppercase | M<br>MK<br>MKT | 9<br>11<br>13 | 3<br>5<br>8 |
| Calc | Absolute Value | Insert absolute value function shift cells to right and turn off column and row headers | M<br>MK<br>MKT | 11<br>14<br>16 | 4<br>6<br>10 |
| Impress | Insert Table | Insert a table, add new slide and hide task pane | M<br>MK<br>MKT | 7<br>9<br>11 | 3<br>5<br>7 |

We selected three modules of LibreOffice 3.4, "swriter", "simpress", and "scale", to illustrate the process the product team would go through and the resulting information it would gain from user performance regression testing. The first step is to identify tasks that the end-user would do in the real world and create representative instances of those tasks. This information usually results from field studies, interviews, questionnaires, or log reports interpreted by user experience professionals. As an illustration, we created four tasks for our study: two tasks in Writer (Format Text and Insert Hyperlink); one task in Impress (Insert Table); and one task in Calc (Absolute Value) (see TABLE 2 for descriptions of the tasks).

Our study considers three hypothetical versions of LibreOffice that introduce different UI features to the end-users. The first version (M) presented only menus to access the functions needed for these tasks. The second (MK) added the ability to access these functions with keyboard shortcuts. The third (MKT) added toolbars for common functions (the default appearance of LibreOffice 3.4)

A description will now be given regarding metrics relating to question RQ1, in accordance with an embodiment of the present principles. The quantitative predictions of skilled task performance time for each method on each version of the system, and the resulting distributions of those predictions, will speak to whether automatic test case generation would produce interesting results for UI usability evaluation (RQ1).

A description will now be given regarding metrics relating to question RQ2, in accordance with an embodiment of the present principles. For RQ2, the metrics are the run time required to generate the test cases, the total number of methods resulting from these test cases in the final CogTool project, the number of inferred methods added by CogTool-Helper, and the human performance predictions for all of the methods.

A description will now be given of the study method of a feasibility study of the present principles, in accordance with an embodiment of the present principles.

To simulate the first two hypothetical versions of LibreOffice in our study, we simply removed the toolbars using LibreOffice 3.4's customization facility. Once the tasks and versions are selected, a testing professional and a user experience professional together would follow the procedure detailed above. The user experience professional would identify common tasks and know how to do them in the application so he or she could identify the widgets and actions necessary to complete the tasks; the testing professional would know how to express these widgets and actions in the GUI testing tool. In our feasibility study, the author fulfilled both these roles, encoding the necessary widgets and actions in GUITAR's format, resulting in the number of events listed for each task and version of the system shown in TABLE 2.

The testing professional and the user experience professional would then review the global rules together and decide if they applied to their system or if a local task rule would need to be written to override a global rule. Together they would write local task rules to express the constraints of each task, again combining their complementary knowledge of the real-world tasks and GUI testing syntax, resulting in the number of rules for each task, for each tool version, as shown in the rightmost column of TABLE 2. The testing professional would then run CogTool-Helper to generate the test cases and create CogTool project files. The user experience professional would import these project files into CogTool to obtain the human performance predictions detailed in the next section. We wrote scripts to automate the import and task construction phase of CogTool-Helper, and then the first author imported each one into CogTool for this study.

To investigate the impact on cost and effectiveness of sampling test cases (RQ2), for each task, we use the last version, with menus, keyboard shortcuts and toolbars, since those have the largest number of test cases. We randomly select (without replacement), the required number of test cases for 5, 10, 25, 50 and 75% of the complete set of test cases. We sample five times at each percentage for each task, to prevent bias from a single outlier run. We then run CogTool-Helper on the samples of test cases and capture the number of methods in the final CogTool project, the number of inferred methods, the run time required to create the designs, as well as the human performance predictions for all of the methods. We then report averages of these values in our results.

We ran all of our experiments on a 64 bit Linux cluster, with 128 GB of RAM per node. Each cluster node includes 32 Opteron 6128, 2.2 GHz processor cores, and 128 GB of RAM. The grid is running Linux 2.6.18 and Java 1.6.0_10.

We used the GUITAR framework (UNO version), version 1.3. We made modifications to the ripper, replayer and test case generator for our experiments. First, we added keyboard shortcuts to the replayer to enable shortcuts. Second, we added a filter to work with the ripper, to tell it to extract the reduced EFG as described above. We did not modify the module that creates the EFG at all. We also added a module to check rules during test case generation (also described above).

A description will now be provided regarding the results of our feasibility study, in accordance with an embodiment of the present principles. We provide data with which to answer our two research questions and discuss the implications of these results for those questions. We then discuss the practical application of our approach more broadly and discuss some interesting future directions.

A description will now be given regarding question RQ1 and usefulness in user interface regression testing, in accordance with an embodiment of the present principles.

TABLE 3 shows human performance predictions, in accordance with an embodiment of the present principles. In TABLE 3, the skilled task execution time is depicted in seconds.

TABLE 3

| Task (Version of System) | No. Test Cases | Mean Time | Min Time | Max Time | SD |
|---|---|---|---|---|---|
| Format Text (M) | 3 | 13.4 | 13.4 | 13.4 | 0.0 |
| Format Text (MN) | 24 | 12.8 | 11.9 | 13.7 | 0.6 |
| Format Text (MKT) | 81 | 11.5 | 8.3 | 13.7 | 1.7 |

TABLE 3-continued

| Task (Version of System) | No. Test Cases | Mean Time | Min Time | Max Time | SD |
|---|---|---|---|---|---|
| Insert Hyperlink (M) | 2 | 20.5 | 19.4 | 21.6 | 1.6 |
| Insert Hyperlink (MM) | 8 | 20.1 | 18.3 | 21.6 | 1.4 |
| Insert Hyperlink (MKT) | 18 | 19.8 | 17.5 | 21.6 | 1.3 |
| Absolute Value (M) | 4 | 18.1 | 17.9 | 18.3 | 0.1 |
| Absolute Value (MK) | 32 | 18.3 | 17.7 | 18.8 | 0.2 |
| Absolute Value (MKT) | 72 | 17.8 | 14.1 | 18.9 | 1.6 |
| Insert Table (M) | 3 | 12.8 | 12.7 | 12.9 | 0.1 |
| Insert Table (MK) | 12 | 12.7 | 12.3 | 13.3 | 0.3 |
| Insert Table (MKT) | 36 | 12.3 | 11.3 | 13.3 | 0.4 |

Figure 7:
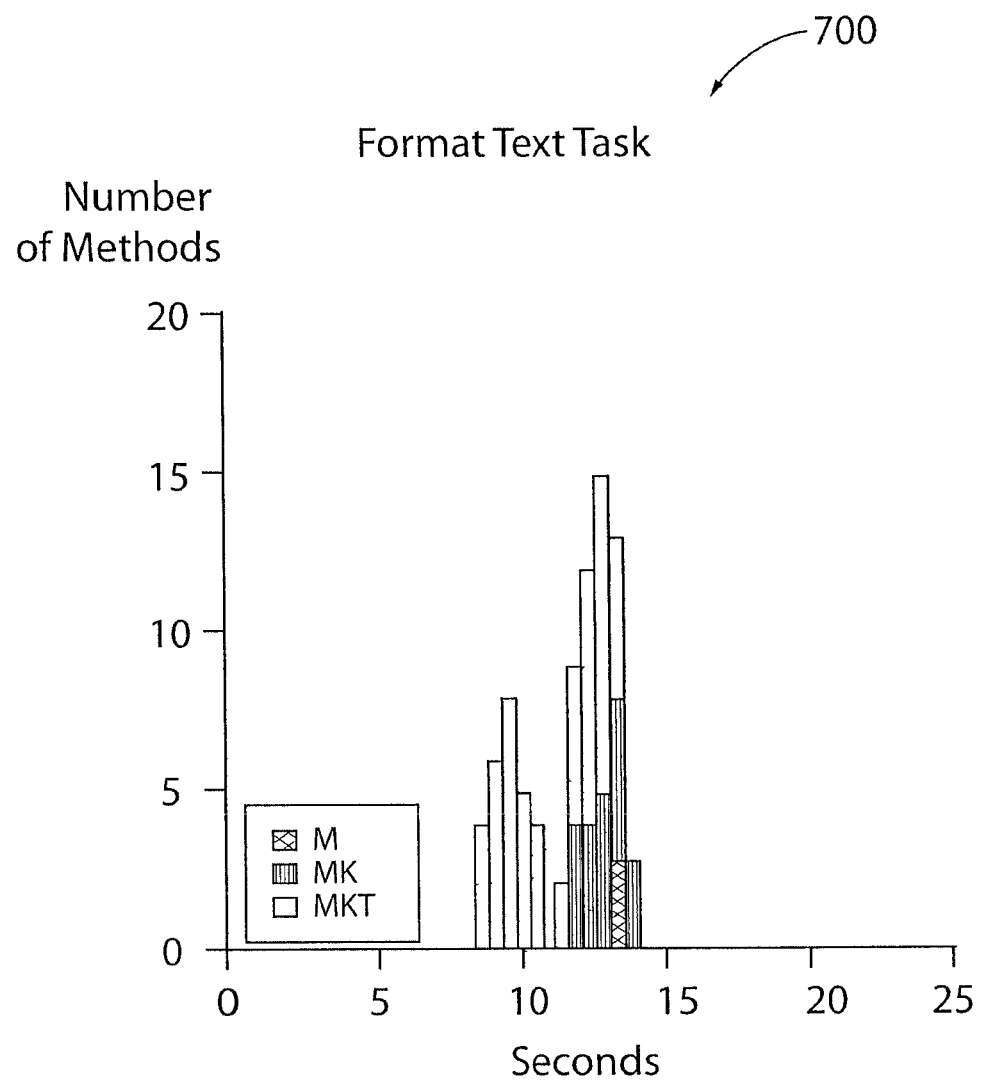
FIG. 7 shows a histogram 700 for the format text task, in accordance with an embodiment of the present principles.
Figure 8:
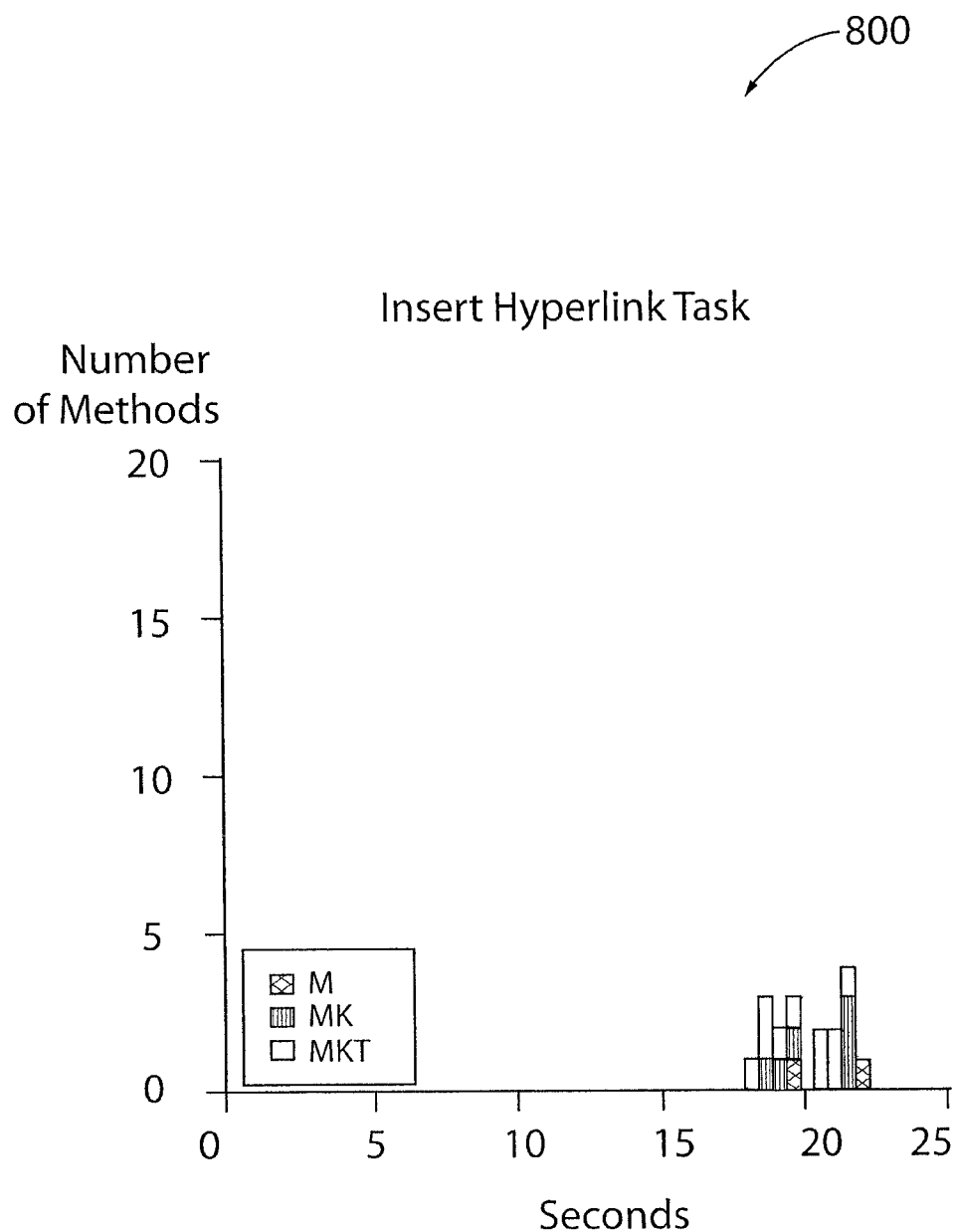
FIG. 8 shows a histogram 800 for the insert hyperlink task, in accordance with an embodiment of the present principles.
Figure 9:
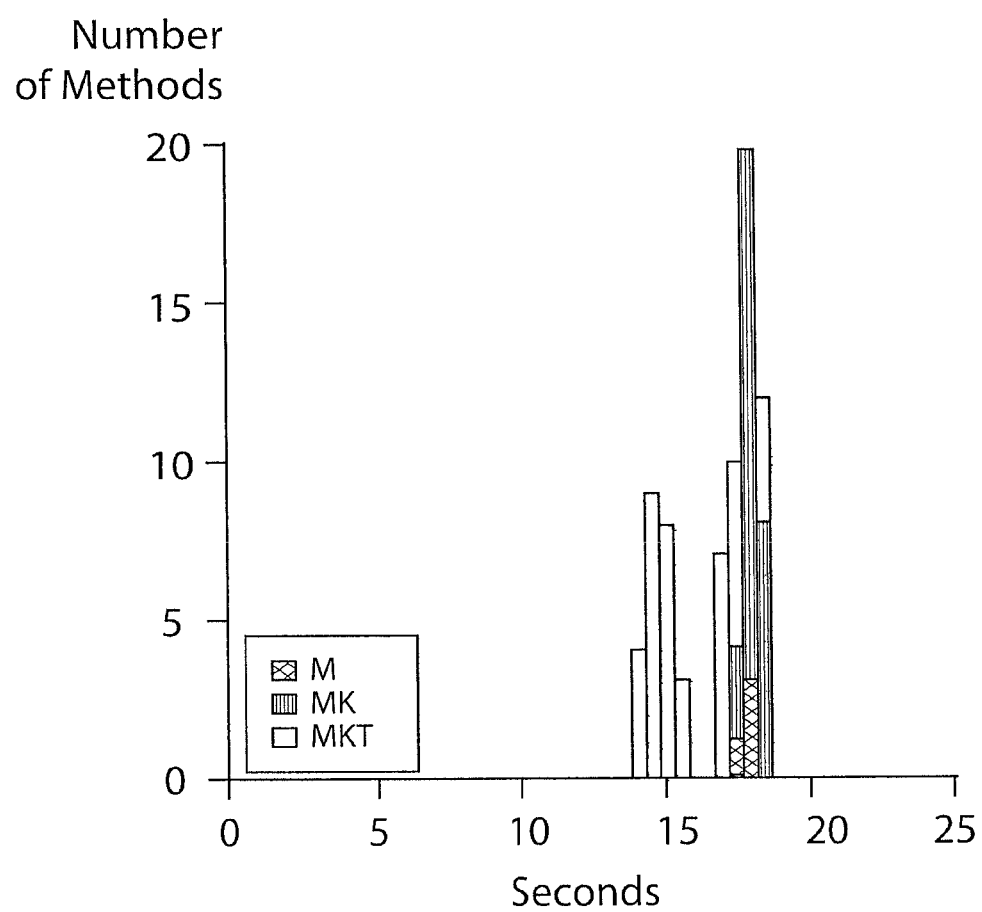
FIG. 9 shows a histogram 900 for the absolute value task, in accordance with an embodiment of the present principles.
Figure 10:
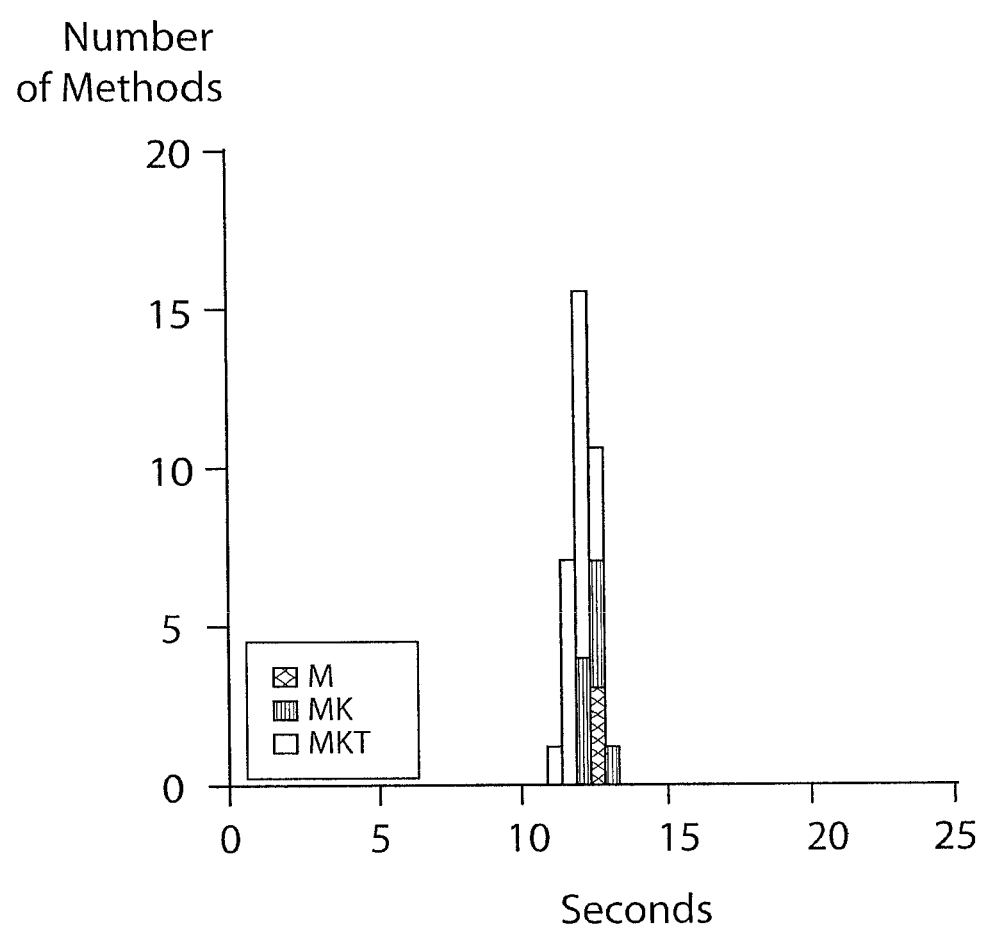
FIG. 10 shows a histogram 1000 for the insert table task, in accordance with an embodiment of the present principles.

TABLE 3 shows the three versions of each task: menu only (M); menu+keyboard (MK); and menu+keyboard+tool-bar (MKT). For each version, we show the number of test cases generated, the mean time predicted for a skilled user to accomplish this task, the minimum predicted time, the maximum predicted time, and the standard deviation. From the raw predictions, we show histograms of the number of test cases by time predictions for each task in each version of the system (FIGS. 7, 8, 9, and 10). FIG. 7 shows a histogram 700 for the format text task, in accordance with an embodiment of the present principles. FIG. 8 shows a histogram 800 for the insert hyperlink task, in accordance with an embodiment of the present principles. FIG. 9 shows a histogram 900 for the absolute value task, in accordance with an embodiment of the present principles. FIG. 10 shows a histogram 1000 for the insert table task, in accordance with an embodiment of the present principles. These histograms are a major contribution of our work because, until this point, user experience professionals would only model one or two ways a user could accomplish a task because the modeling had to be done by hand.

Looking first at TABLE 3, in all but one case (Absolute Value), the mean time decreases with the addition of keyboard shortcuts and in all cases it decreases again with the addition of the toolbar. This suggests that, for tasks that can take advantage of toolbars, the skilled end-user will indeed be able to perform their work in less time with the newest version. Perhaps more revealing is the decrease in minimum time to accomplish each task, which is all cases decreases with system version, by as much as 40% for the Format task. This suggests that the most proficient skilled users could be substantially more efficient, information potentially useful for marketing or sales. In addition, the paths that displayed this efficiency might feed directly into training videos or "tips of the day" to help end-users attain such proficiency.

The maximum time tells a different story about the benefits of keyboard shortcuts and toolbars. In three of the four tasks, adding the keyboard shortcuts increases the maximum predicted time because methods that mix menus and keyboards require the user to move the hand between the mouse and keyboard. This information might encourage project teams to increase the coverage of keyboard shortcuts to keep the user's hands on the keyboard (this would also have the side effect of increasing accessibility for users who cannot operate a mouse). On the other hand, adding the toolbar does not affect the maximum time for three of the tasks, meaning that no mixed methods involving the toolbar are slower than those involving the menus and keyboard. Therefore, adding the toolbar has no downside for efficiency. However, in the Absolute Value task, the maximum time increases slightly because the presence of the toolbar forced a dialog box to be moved, requiring the user to move the mouse further to interact with it. Moving the dialog box is a design decision that could be reversed after regression testing the efficiency of the new design reveals this problem.

Turning to the histograms, they provide information never seen before with predictive human performance modeling, i.e., the distribution of times associated with methods using different UI features and methods using a mixture of those features. The histograms for Insert Hyperlink and Insert Table (right half of FIGS. 8, 9, 10, and 11), indicate that the progressive addition of features changes the range and mean of the distribution but not the basic shape. However, the addition of toolbars changes the shape of Format Text and Absolute Value (left half of FIGS. 8, 9, 10, and 11) from being clustered around a mean to being bimodal. This can have implications for training, guiding users to the lower cluster of methods, allowing them to be far more efficient with the new version than with the older versions of the system.

Comparing CogTool-Helper's analyses to those used by user experience professionals in the past, consider the different information provided by this extensive exploration of possible methods compared to modeling individual methods by hand. Typically, the user experience professional would model one method using the menus, one using keyboard shortcuts as much as possible, and one using toolbars as much as possible. These models for the Insert Hyperlink task predict times of 19.4 s, 18.3 s and 18.0 s, respectively, all in the lower portion of the bimodal distribution. The by-hand analysis still shows that the progressive addition of features is improving efficiency, but does not reveal the possible poor performance cluster of methods that might be avoided through training.

Finally, we note that CogTool was designed to allow UI designers to analyze UI design proposals before implementing them. Thus, the analyses shown here, generated from existing systems, could be the baseline for examining new design ideas. If UI designers do not need to spend much time modeling benchmark tasks on a baseline existing system, they may employ CogTool in the traditional way to assess a broader range of design ideas, avoiding premature focus on a single design direction.

The results in the last few paragraphs arise from using an equal weighting of all test cases to determine values in TABLE 3 and draw the histograms. In the absence of real-world information about our fictitious versions of the system and tasks, we used the assumption of equal weighting to demonstrate some of the practical implications of this work. However this weighting reflects the assumption that end-users in the real world will perform the task using the method in each test case an equal number of times. This is not necessarily a realistic assumption. It has been observed that people select their methods based on personal preferences (e.g., some prefer menus, others prefer keyboard shortcuts) or characteristics of the task (e.g., at one point in a task the user's hand is already on the mouse, so it is more likely the user will use a toolbar button than if the user's hand is on the keyboard). If the analysis is of a system already released, the user experience professional may have log data to refine the weighting assumption, or prior experience with the user community may influence the weights. The values and histograms will change but the information they provide can be used to reveal properties of the UI design as illustrated above.

All models are approximations of reality, and CogTool's implementation of the KLM is considered to be +−10% of the average human performance a user experience professional would observe were he or she able to collect skilled time empirically. Part of the variability in human behavior that KLM and CogTool did not capture in previous studies is just what we are exploring here, i.e., the variation in ways to accomplish a task that skilled users exhibit. Another factor is normal variation in all human performance between and within individuals (e.g., slower performance when fatigued, faster after having drunk a cup of coffee, etc.). HCI research is just beginning to explore modeling tools that predict the latter and ours is the first tool we know of to make it easy to predict the former. These new tools will allow HCI researchers to understand the contributing factors of variation and how they combine.

A description will now be given regarding question RQ2 and the impact of sampling, in accordance with an embodiment of the present principles.

In RQ2, we examine the impact of inferred methods on the design construction phase of CogTool-Helper to evaluate whether we can sample test cases rather than generate and run every test case for every task. We believe this will help in scalability of large tasks and when time is limited as is usually the case in regression testing.

TABLE 4 shows the results of sampling test cases for version (MKT), in accordance with an embodiment of the present principles. The results pertain to an average of 5 runs.

TABLE 4

| | Design Construction | | CogTool Analysis | | | | |
|---|---|---|---|---|---|---|---|
| Task (Sample %/size) | Run Time (m) | % Red | No. Methods | No. Inferred | Mean Time (s) | Min Time (s) | Max Time (s) |
| Format Text (5%/4) | 8.5 | 94.3 | 12.8 | 8.8 | 11.9 | 9.9 | 13.4 |
| Format Text (10%/8) | 15.3 | 89.8 | 41.4 | 33.4 | 11.6 | 8.5 | 13.7 |
| Format Text (25%/20) | 36.8 | 75.4 | 76.2 | 56.2 | 11.5 | 8.3 | 13.7 |
| Format Text (50%/41) | 77.4 | 48.3 | 81.0 | 40.0 | 11.5 | 8.3 | 13.7 |
| Format Text (All) | 149.8 | — | 81.0 | — | 11.5 | 8.3 | 13.7 |
| Insert Hyperlink (5%/1) | 3.5 | 90.4 | 1.0 | 0.0 | 19.6 | 19.6 | 19.6 |
| Insert Hyperlink (10%/2) | 5.6 | 84.4 | 3.4 | 1.4 | 20.1 | 19.1 | 21.0 |
| Insert Hyperlink (25%/5) | 12.6 | 65.0 | 15.6 | 10.6 | 19.7 | 17.5 | 21.5 |
| Insert Hyperlink (50%/9) | 20.1 | 44.4 | 18.0 | 9.0 | 19.8 | 17.5 | 21.6 |
| Insert Hyperlink (All) | 36.1 | — | 18.0 | — | 19.8 | 17.5 | 21.6 |
| Absolute Value (5%/4) | 14.6 | 93.7 | 14.8 | 10.8 | 17.6 | 15.2 | 18.8 |
| Absolute Value (10%/7) | 23.7 | 89.7 | 25.8 | 18.8 | 16.9 | 14.1 | 18.7 |
| Absolute Value (25%/18) | 59.4 | 74.3 | 56.4 | 38.4 | 17.0 | 14.1 | 18.9 |
| Absolute Value (50%/36) | 116.2 | 49.7 | 69.6 | 33.6 | 17.1 | 14.1 | 18.9 |
| Absolute Value Task (All) | 231.1 | — | 72.0 | — | 17.1 | 14.1 | 18.9 |
| Insert Table (5%/2) | 5.0 | 92.2 | 3.6 | 1.6 | 12.3 | 11.8 | 12.7 |
| Insert Table (10%/4) | 8.7 | 86.6 | 6.4 | 2.4 | 12.3 | 11.8 | 12.8 |
| Insert Table (25%/9) | 17.3 | 73.2 | 19.4 | 10.4 | 12.3 | 11.4 | 13.1 |

TABLE 4-continued

| Task (Sample %/size) | Design Construction | | CogTool Analysis | | | | |
|---|---|---|---|---|---|---|---|
| | Run Time (m) | % Red | No. Methods | No. Inferred | Mean Time (s) | Mm Time (s) | Max Time (s) |
| Insert Table (50%/18) | 34.5 | 46.5 | 32.8 | 14.8 | 12.4 | 11.4 | 13.3 |
| Insert Table Task (All) | 64.5 | — | 36.0 | — | 12.3 | 11.3 | 13.3 |

In particular, TABLE 4 shows data for each task on the last version (MKT) sampled at 5, 10, 25 and 50% along with the number of test cases (sample size). We show the time in minutes taken, averaged over five samples, for CogTool-Helper to run the test cases and create the designs, followed by the average percent reduction over running all of the test cases. We list the average number of methods in the resulting CogTool project, along with the average number of inferred methods. The last three columns show the times in seconds of the CogTool human performance predictions (average, mean, minimum and maximum). The last row of each task includes data for the full set of test cases.

We see between a 90.4% and 94.3% reduction in the 5% sample, but we also see a loss in the range of predicted human performance times. In the worst case, (Insert Hyperlink), the samples have a single test case with zero inferred methods; the UI designer has only a single point of reference.

In all four tasks the 50% samples have the full range of human performance values, and we either generate all of the methods that are possible for that task with the inferred method algorithm (Format Text and Insert Hyperlink), or come within 10% of all possible methods (Absolute Value and Insert Table). The runtime savings are over 50%, which equates to almost 2 hours in the Absolute Value task.

As will be appreciated by one skilled in the art, aspects of the present principles may be embodied as a system, method or computer program product. Accordingly, aspects of the present principles may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present principles may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present principles may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present principles are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present principles. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Reference in the specification to "one embodiment" or "an embodiment" of the present principles, as well as other variations thereof, means that a particular feature, structure, characteristic, and so forth described in connection with the embodiment is included in at least one embodiment of the present principles. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Having described preferred embodiments of a system and method (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A system for providing usability predictions, comprising:
   a test case collector for obtaining test cases for analyzing usability of a graphical user interface of a given software application, the test case collector having at least a memory storing the test cases;
   a human performance model generator for automatically generating a human performance model based on the test cases;
   a usability predictor for generating the usability predictions based on the human performance model; and
   a rule generator for generating a set of rules that semantically refines one or more tasks applicable to the graphical user interface,
   wherein said test case collector automatically generates at least some of the test cases from an analysis of the given software application.

2. The system of claim 1, wherein at least some of the test cases are executed to generate test case execution data, and the human performance model is automatically generated based on the test case execution data.

3. The system of claim 1, wherein at least some of the test cases are generated from a demonstration by a human, and the system further comprises a human demonstration capture device for capturing the demonstration.

4. The system of claim 1, where the human performance model includes a graphical user interface model and task models.

5. The system of claim 1, wherein said test case generator infers additional possible methods for tasks not defined in the test cases.

6. The system of claim 1, wherein the usability prediction comprises a skilled execution time.

7. The system of claim 1, wherein the usability prediction comprises a navigation path for a given task.

8. The system of claim 1, wherein the usability prediction comprises user errors.

9. The system of claim 1, further comprising:
   a semantic evaluator for semantically evaluating the test cases to generate semantic data therefor; and
   a test case pruner for pruning test cases from being executed responsive to the semantic data.

10. The system of claim 1, wherein the set of rules comprise global rules and task specific rules, the global rules usable for all tasks, and the task specific rules being to a particular task.

11. The system of claim 10, wherein the global rules comprise a particular rule mandating that each of the test cases end with a system interaction event in a main window of the graphical user interface or each of the test cases end with a terminal event resulting in only the main window being opened.

12. The system of claim 10, wherein the global rules comprise a particular rule mandating that an event that expands a menu or a list must be immediately followed by an event that is executed on a child of the menu or the list.

13. The system of claim 10, wherein the global rules comprise a particular rule mandating that a window in the graphical user interface cannot be opened and immediately closed without an intervening event occurring.

14. The system of claim 10, wherein at least one of the global rules is used together with a particular one of the task specific rules such that an event is restricted from appearing more than once in any of the test cases according to the at least one of the global rules, unless the event is allowed to appear more than once according to the particular one of the task specific rules.

15. The system of claim 14, wherein the particular one of the task specific rules mandates that events in a repeat list of events are permitted to be used more than once in a particular one or more of the test cases.

16. The system of claim 10, wherein the task specific rules comprise a particular rule mandating that exactly one of the events in an exclusion set of events must be included in each of the test cases.

17. The system of claim 10, wherein the task specific rules comprise a particular rule mandating a partial order on system interaction events.

18. The system of claim 10, wherein the partial order is determined by grouping the system interaction events into a plurality of order groups, and then placing the plurality of order groups into a corresponding order, where each of the system interaction events in a respective one of the plurality of order groups are in a same respective ordering equivalence class.

19. The system of claim 10, wherein the task specific rules comprise a particular rule mandating that events in a required list of events must appear in each of the test cases.

20. A system for providing usability predictions, comprising:
 a test case generator for obtaining test cases for analyzing usability of a graphical user interface of a given software application;
 a semantic evaluator for semantically evaluating the test cases to generate test case semantic data;
 a test case pruner for pruning test cases responsive to one or more predefined criterion relating to the test case semantic data;
 a rule generator for generating a set of rules that semantically refines one or more tasks applicable to the graphical user interface responsive to the test case semantic data;
 a test case executor, having a processor, for executing the test cases to generate test case execution data;
 a human performance model generator for automatically generating a human performance model based on the test case execution data; and
 a usability predictor for generating the usability predictions based on the human performance mode.

21. The system of claim 20, wherein said test case generator automatically generates at least some of the test cases from an analysis of the given software application.

22. The system of claim 20, where the human performance model includes a graphical user interface model and task models.

23. The system of claim 20, wherein the set of rules comprise global rules and task specific rules, the global rules usable for all tasks, and the task specific rules being to a particular task.

24. A non-transitory computer program product for providing usability predictions, the computer program product comprising a computer readable storage medium having program code embodied therewith, the program code executable by a computer to perform a method comprising:
 obtaining test cases for analyzing usability of a graphical user interface of a given software application;
 executing the test cases to generate test case execution data;
 automatically generating a human performance model based on the test case execution data;
 generating the usability predictions based on the human performance model; and
 generating a set of rules that semantically refines one or more tasks applicable to the graphical user interface,
 wherein at least some of the test cases are generated automatically from an analysis of the given software application.

* * * * *